US011990031B2

(12) United States Patent
Guzik

(10) Patent No.: US 11,990,031 B2
(45) Date of Patent: *May 21, 2024

(54) NETWORK OPERATING CENTER (NOC) WORKSPACE INTEROPERABILITY

(71) Applicants: Getac Technology Corporation, New Taipei (TW); WHP Workflow Solutions, Inc., North Charleston, SC (US)

(72) Inventor: Thomas Guzik, Edina, MN (US)

(73) Assignees: Getac Technology Corporation, New Taipei (TW); WHP Workflow Solutions Inc., North Charleston, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/117,698

(22) Filed: Mar. 6, 2023

(65) Prior Publication Data

US 2023/0206749 A1 Jun. 29, 2023

Related U.S. Application Data

(63) Continuation of application No. 17/107,785, filed on Nov. 30, 2020, now Pat. No. 11,605,288.

(51) Int. Cl.
*G08C 25/00* (2006.01)
*G06F 16/2455* (2019.01)
(Continued)

(52) U.S. Cl.
CPC ....... *G08C 25/00* (2013.01); *G06F 16/24568* (2019.01); *H04L 65/70* (2022.05); *H04L 67/12* (2013.01)

(58) Field of Classification Search
CPC ... G08C 25/00; G06F 16/24568; H04L 65/70; H04L 67/12
See application file for complete search history.

(56) References Cited

U.S. PATENT DOCUMENTS 6,760,744 B1 7/2004 Halaas et al.
7,917,888 B2 3/2011 Chong et al.
(Continued)

FOREIGN PATENT DOCUMENTS

CN 109671266 B 11/2020
JP 2008204219 A 9/2008
(Continued)

OTHER PUBLICATIONS

International Patent Application No. PCT/US2021/060890, International Search Report and Written Opinion dated Mar. 21, 2022, 11 pages.

(Continued)

*Primary Examiner* — David R Lazaro
(74) *Attorney, Agent, or Firm* — Finnegan, Henderson Farabow, Garrett & Dunner, L.L.P.

(57) ABSTRACT

This disclosure describes techniques for a consumer application that integrates a model-controller-view (MCV) design pattern with an event streaming platform such as an Apache Kafka™ in a network operation center (NOC) server to support NOC workspace interoperability. The MCV design pattern may include a pattern that divides an application into three main logical components (e.g., model component, controller component, and view component) to handle specific aspects of the application. In one example, the model component decouples the telemetry data streams from an event stream platform, and the controller component filters a queried set of decoupled telemetry data streams to dynamically control views to be rendered in the view component.

20 Claims, 4 Drawing Sheets

(51) Int. Cl.
  *H04L 65/70* (2022.01)
  *H04L 67/12* (2022.01)

(56) References Cited

U.S. PATENT DOCUMENTS

| | | | |
|---|---|---|---|
| 8,452,722 B2 | 5/2013 | Naeve et al. | |
| 8,606,844 B2 | 12/2013 | Kaufman et al. | |
| 8,688,320 B2 | 4/2014 | Faenger | |
| 9,110,774 B1 | 8/2015 | Bonn et al. | |
| 9,264,678 B2 | 2/2016 | Nuyttens et al. | |
| 9,449,229 B1* | 9/2016 | Laska | G08B 13/19606 |
| 9,483,732 B1 | 11/2016 | Milakovich | |
| 9,485,474 B2 | 11/2016 | Kim et al. | |
| 9,681,104 B2* | 6/2017 | Billau | G08B 13/19656 |
| 9,723,251 B2* | 8/2017 | Slotky | H04N 5/77 |
| 9,738,125 B1 | 8/2017 | Brickley et al. | |
| 9,755,890 B2 | 9/2017 | Robertson et al. | |
| 9,832,205 B2 | 11/2017 | Santhi et al. | |
| 9,848,312 B2 | 12/2017 | Sundel et al. | |
| 9,852,132 B2 | 12/2017 | Chhichhia et al. | |
| 9,886,261 B1 | 2/2018 | Hotchkies | |
| 10,324,773 B2* | 6/2019 | Wing | G06Q 10/10 |
| 10,460,014 B2 | 10/2019 | Lloyd et al. | |
| 10,540,883 B1 | 1/2020 | Keil et al. | |
| 10,902,955 B1 | 1/2021 | Federoff et al. | |
| 11,238,290 B2* | 2/2022 | Burns | G06V 20/41 |
| 11,605,288 B2* | 3/2023 | Guzik | H04L 65/61 |
| 2003/0081127 A1* | 5/2003 | Kirmuss | G11B 27/36 |
| | | | 348/E7.086 |
| 2003/0095688 A1* | 5/2003 | Kirmuss | G08B 13/19695 |
| | | | 348/E7.086 |
| 2003/0163512 A1 | 8/2003 | Mikamo | |
| 2003/0208679 A1 | 11/2003 | Vazquez | |
| 2006/0257001 A1 | 11/2006 | Veen et al. | |
| 2008/0147267 A1 | 6/2008 | Plante et al. | |
| 2008/0303903 A1* | 12/2008 | Bentley | G08B 13/19676 |
| | | | 348/E7.086 |
| 2009/0150017 A1 | 6/2009 | Caminiti et al. | |
| 2009/0210455 A1 | 8/2009 | Sarkar et al. | |
| 2009/0248711 A1 | 10/2009 | Martinez et al. | |
| 2009/0284359 A1 | 11/2009 | Huang et al. | |
| 2010/0036560 A1 | 2/2010 | Wright et al. | |
| 2010/0144318 A1 | 6/2010 | Cable | |
| 2011/0205068 A1 | 8/2011 | Huynh et al. | |
| 2011/0302151 A1 | 12/2011 | Abadi et al. | |
| 2012/0084747 A1 | 4/2012 | Chakradhar et al. | |
| 2013/0039542 A1 | 2/2013 | Guzik | |
| 2013/0344856 A1 | 12/2013 | Silver et al. | |
| 2013/0347005 A1 | 12/2013 | Lam et al. | |
| 2014/0343796 A1 | 11/2014 | Abuelsaad et al. | |
| 2015/0089019 A1 | 3/2015 | Chou | |
| 2015/0341370 A1 | 11/2015 | Khan | |
| 2016/0042767 A1* | 2/2016 | Araya | H04N 7/181 |
| | | | 386/201 |
| 2016/0086397 A1 | 3/2016 | Phillips | |
| 2016/0153801 A1 | 6/2016 | Cho et al. | |
| 2016/0190859 A1 | 6/2016 | Blum et al. | |
| 2016/0248856 A1 | 8/2016 | Kao | |
| 2016/0371553 A1 | 12/2016 | Farnham, IV et al. | |
| 2016/0378607 A1 | 12/2016 | Kumar et al. | |
| 2017/0011324 A1 | 1/2017 | Truong et al. | |
| 2017/0048482 A1* | 2/2017 | Drako | H04N 19/61 |
| 2017/0148027 A1 | 5/2017 | Yu et al. | |
| 2017/0161323 A1 | 6/2017 | Simitsis et al. | |
| 2017/0161409 A1 | 6/2017 | Martin | |
| 2017/0164062 A1* | 6/2017 | Abramov | H04N 21/4524 |
| 2018/0079413 A1 | 3/2018 | Herrero et al. | |
| 2018/0145923 A1 | 5/2018 | Chen et al. | |
| 2018/0285759 A1 | 10/2018 | Wood et al. | |
| 2018/0365909 A1 | 12/2018 | Cheng et al. | |
| 2019/0019122 A1 | 1/2019 | Allen | |
| 2019/0026665 A1 | 1/2019 | Caskey et al. | |
| 2019/0043351 A1 | 2/2019 | Yang et al. | |
| 2019/0054925 A1 | 2/2019 | Froeschl et al. | |
| 2019/0095805 A1 | 3/2019 | Tristan et al. | |
| 2019/0140886 A1 | 5/2019 | Zywicki et al. | |
| 2019/0325354 A1 | 10/2019 | Rajnayak et al. | |
| 2020/0007827 A1 | 1/2020 | Saad et al. | |
| 2020/0072637 A1 | 3/2020 | Guidotti et al. | |
| 2020/0074156 A1* | 3/2020 | Janumpally | G06F 18/00 |
| 2020/0081899 A1 | 3/2020 | Shapur et al. | |
| 2020/0145620 A1* | 5/2020 | Alcantara | G06V 20/35 |
| 2020/0151360 A1 | 5/2020 | Zavesky et al. | |
| 2020/0172112 A1 | 6/2020 | Kawashima | |
| 2020/0211216 A1 | 7/2020 | Hagio et al. | |
| 2020/0304854 A1 | 9/2020 | Baumgartner et al. | |
| 2020/0312046 A1* | 10/2020 | Righi | G07C 5/008 |
| 2020/0351381 A1 | 11/2020 | Lacey et al. | |
| 2020/0387833 A1 | 12/2020 | Kursun | |
| 2021/0076002 A1 | 3/2021 | Peters et al. | |
| 2021/0089374 A1 | 3/2021 | Watson et al. | |
| 2021/0133808 A1 | 5/2021 | Chan et al. | |
| 2021/0136277 A1 | 5/2021 | McFarlane | |
| 2021/0272702 A1 | 9/2021 | Hakami | |
| 2021/0297929 A1 | 9/2021 | Frusina et al. | |
| 2021/0377205 A1* | 12/2021 | Brown | H04L 65/70 |
| 2022/0014907 A1 | 1/2022 | Boyd et al. | |
| 2022/0169258 A1 | 6/2022 | Samarthyam et al. | |
| 2022/0172604 A1* | 6/2022 | Guzik | H04L 65/70 |
| 2022/0291752 A1* | 9/2022 | Agu | A63F 13/26 |
| 2023/0206749 A1* | 6/2023 | Guzik | H04L 65/61 |
| | | | 340/870.01 |

FOREIGN PATENT DOCUMENTS

| | | |
|---|---|---|
| KR | 20130010400 A | 1/2013 |
| KR | 20190086134 A | 7/2019 |
| WO | 2010056891 A1 | 5/2010 |

OTHER PUBLICATIONS

International Patent Application No. PCT/US2021/060892, International Search Report and Written Opinion dated Mar. 21, 2022, 10 pages.

International Patent Application No. PCT/US2021/060893, International Search Report and Written Opinion dated Mar. 21, 2022, 9 pages.

International Patent Application No. PCT/US2021/060894, International Search Report and Written Opinion dated Mar. 21, 2022, 9 pages.

International Patent Application No. PCT/US2021/060895, International Search Report and Written Opinion dated Mar. 21, 9 pages.

International Patent Application No. PCT/US2021/060896, International Search Report and Written Opinion dated Mar. 14, 2022, 11 pages.

Juan Rendon et al. Structural combination of neural network models. 2016 IEEE 16th International Conference on Data Mining Workshops (ICDMW). IEEE. Dec. 12, 2016, pp. 406-413. Section II; and figure 2.

Massimo Bonavita et al. Machine Learning for Model Error Inference and Correction. Journal of Advances in Modeling Earth Systems. Nov. 13, 2020, pp. 1-22. Section 2.1; and figure 1.

Md Manjurul Ahsan et al. Deep MLP-CNN Model Using Mixed-Data to Distinguish between COVID-19 and Non-COVID-19 Patients. Symmetry 2020. Sep. 16, 2020, pp. 1-14. Section 2; and figure 3.

U.S. Appl. No. 17/1017,785, Notice of Allowance dated Nov. 10, 2022, 26 pages.

U.S. Appl. No. 17/107,708, Final Office Action dated Aug. 19, 2022, 52 pages.

U.S. Appl. No. 17/107,708, Office Action dated May 9, 2022, 57 pages.

U.S. Appl. No. 17/107,714. Office Action dated Aug. 18, 2022, 66 pages.

U.S. Appl. No. 17/107,764, Notice of Allowance dated May 26, 2022, 26 pages.

U.S. Appl. No. 17/107,764, Office Action dated Dec. 8, 2021, 38 pages.

U.S. Appl. No. 17/107,785, Final Office Action dated May 11, 2022, 9 pages.

(56) References Cited

OTHER PUBLICATIONS

U.S. Appl. No. 17/107,785, Office Action dated Jul. 7, 2022, 21 pages.
U.S. Appl. No. 17/107,785, Office Action dated Mar. 29, 2022, 30 pages.
U.S. Appl. No. 17/107,824, Notice of Allowance dated May 2, 2022, 34 pages.
U.S. Appl. No. 17/107,824, Notice of Allowance dated Jun. 7, 2022, 33 pages.
U.S. Appl. No. 17/107,824, Office Action dated Dec. 29, 2021, 30 pages.
U.S. Appl. No. 17/107,830, Office Action dated Jun. 7, 2022, 51 pages.
U.S. Appl. No. 17/107,877, Final Office Action dated Dec. 29, 2021, 40 pages.
U.S. Appl. No. 17/107,877, Notice of Allowance dated Aug. 22, 2022, 40 pages.
U.S. Appl. No. 17/107,877, Office Action dated Aug. 18, 2021, 40 pages.
U.S. Appl. No. 17/107,891, Final Office Action dated Aug. 5, 2021, 21 pages.
U.S. Appl. No. 17/107,891, Notice of Allowance dated Nov. 2, 2021, 23 pages.
U.S. Appl. No. 17/107,891, Office Action dated Apr. 1, 2021, 22 pages.
Van Hiep Phung et al. A High-Accuracy Model Average Ensemble of Convolutional Neural Networks for Classification of Cloud Image Patches on Small Datasets. Applied Sciences 2019. Oct. 23, 2019, pp. 1-16. Section 2; and figure 3.
Xueheng Qiu et al. Ensemble Deep Learning for Regression and Time Series Forecasting. 2014 IEEE Symposium on Computational Intelligence in Ensemble Learning (CIEL). IEEE, Dec. 9, 2014, pp. 1-6.
Li et al. "Exploration of classification confidence in ensemble learning" Sep. 2014. URL: https://www.sciencedirect.com/science/article/pi i/S0031320314001198 (Year: 2014).
Mousavi et al. "A new ensemble learning methodology based on hybridization of classifier ensemble selection approaches", Dec. 2015. URL: https://www.sciencedirect.com/science/article/pii/S1568494615005797 (Year: 2015).
U.S. Appl. No. 17/107,708, Notice of Allowance dated Mar. 29, 2023, 26 pages.
U.S. Appl. No. 17/107,877, Office Action dated Aug. 4, 2023, 91 pages.
U.S. Appl. No. 17/863,107, Office Action dated Mar. 23, 2023, 32 pages.
U.S. Appl. No. 18/117,936, Notice of Allowance dated Sep. 20, 2023, 21 pages.
U.S. Appl. No. 18/117,936, Office Action dated Jul. 19, 30 pages.
Wang et al., Supporting Very Large Models using Automatic Dataflow Graph Partitioning, 2019. URL: https://arxiv.org/abs/1807.08887 (Year: 2019).

\* cited by examiner

NETWORK OPERATING CENTER (NOC) WORKSPACE INTEROPERABILITY

This application is a continuation of U.S. application Ser. No. 17/107,785, filed on Nov. 30, 2020, and titled "NETWORK OPERATING CENTER (NOC) WORKSPACE INTEROPERABILITY," which is herein incorporated by reference in its entirety.

BACKGROUND

Law enforcement agencies provide officers and agents with an assortment of devices—electronic and otherwise—to carry out duties required of a law enforcement officer. Such devices include radios (in-vehicle and portable), body-worn cameras, weapons (guns, Tasers, clubs, etc.), portable computers, and the like. In addition, vehicles such as cars, motorcycles, bicycles, may be equipped with electronic devices associated with the vehicle, such as vehicle cameras, sirens, beacon lights, spotlights, and personal computers.

It is increasingly common for law enforcement agencies to require officers to activate cameras (body-worn and vehicle-mounted) that enable officers to capture audio and/or video contents of incidents in which an officer is involved. This provides a way to preserve evidence, that would otherwise be unavailable, for subsequent legal proceedings. This evidence greatly aids in the investigation of criminal activities, identification of perpetrators of crimes, and an examination of allegations of police misconduct, to name a few advantages.

It is also desirable to further investigate the incidents based on the captured audio and/or video contents. In a network environment setting where different devices from different places can be used to consume and investigate the captured audio and/or video contents, there is a need to maintain consistent reliability of consumed audio and/or video contents.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
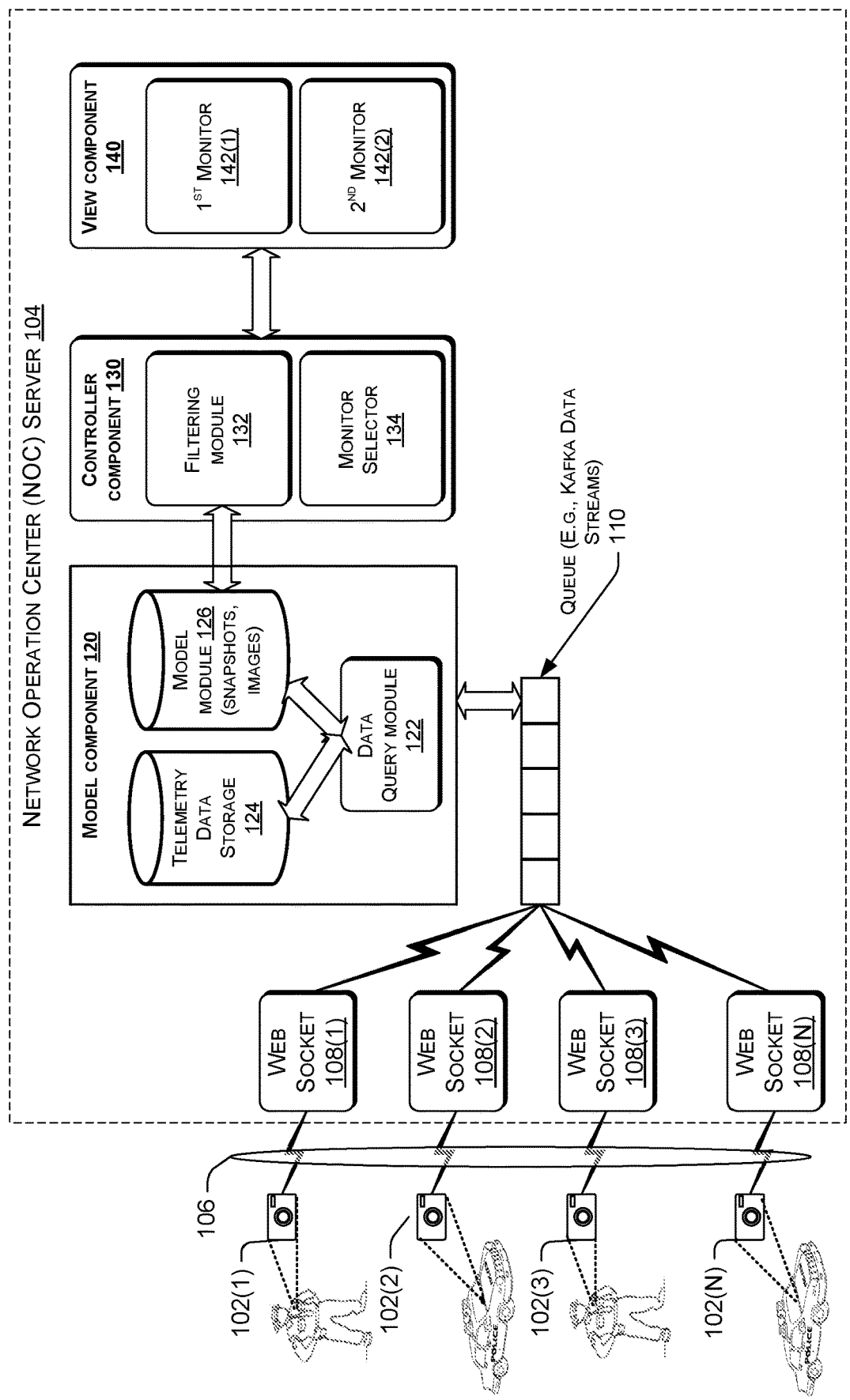
FIG. 1 illustrates an example architecture that integrates a model-controller-view (MCV) design pattern with an event streaming platform such as an Apache Kafka™ in a network operation center (NOC) server to support NOC workspace interoperability, in accordance with at least one embodiment.

This disclosure is directed to techniques for a network operation center (NOC) server that integrates a model-controller-view (MCV) design pattern with an event streaming platform to support NOC workspace interoperability. The telemetry data streams may include data packet streams of audio content, video content, metadata, virtual reality or augmented reality data, and information that can be encoded in JavaScript Object Notation (JSON), Extensible Markup Language (XML), or other structured data modeling language. The MCV design pattern may include a structure that divides an application into three main logical components (e.g., model component, controller component, and view component) to handle specific aspects of the application (e.g., consumer application). As opposed to a Model-View-Controller (MVC) design pattern, the MCV design pattern includes the controller component that may be directly tied to the model component. In one example, telemetry data streams from heterogeneous sources (e.g., different types of media recording devices) are pushed into an event streaming platform such as Apache Kafka™, and the model component of the application decouples and stores the decoupled telemetry data streams. The controller component that is tied to the model component may then perform a filtering operation on queried decoupled telemetry data streams (sometimes also called models) to dynamically control views to be rendered on at least one display unit of the view component without losing control of continuity of the decoupled telemetry data streams. Alternatively, or in addition, the controller component may dynamically delete the views on some of the display units without affecting an order of telemetry data streams that are decoupled from the event streaming platform. In these cases, the dynamic rendering of views supports NOC workspace interoperability that can be critically important in law enforcement operations at least because they can enable performance of multi-functions without affecting the continuity (sometimes called configuration) of the decoupled telemetry data streams from the event streaming platform. Accordingly, while the model (e.g., queried decoupled telemetry data streams) can be independently filtered by the controller component, the decoupled telemetry data streams in the telemetry data storage may not be affected by filtering operations/functions.

In one example, the multi-functions may include listening to audio content in one display unit and watching video content on another display unit. In another example, the multi-functions may include watching images captured by a specific media recording device in some of the display units. In another example, images from different timestamps and from different media recording device identifications (IDs) may be watched and analyzed on some of the display units. In another example, the images are transformed into different scales or color formats to match a configuration of the display units. In these examples, the controller component that is tied to the model component in the MCV design pattern may perform the filtering operations on the same model to generate filtered telemetry data streams that can be rendered on the display units to support NOC workspace interoperability.

As used herein, the terms "device," "portable device," "electronic device," and "portable electronic device" are used to indicate similar items and may be used interchangeably without affecting the meaning of the context in which they are used. Further, although the terms are used herein in relation to devices associated with law enforcement, it is noted that the subject matter described herein may be applied in other contexts as well, such as in a security system that utilizes multiple cameras and other devices.

The implementation and operations described above ascribed to the use of the server; however, alternative implementations may execute certain operations in conjunction with or wholly within a different element or component of the system(s). Further, the techniques described herein may be implemented in a number of contexts, and several example implementations and context are provided with reference to the following figures. The term "techniques," as used herein, may refer to system(s), method(s), computer-readable instruction(s), module(s) m algorithms, hardware logic, and/or operation(s) as permitted by the context described above and throughout the document.

Example Architecture

FIG. 1 illustrates a schematic view of an example base architecture 100 that integrates an MCV design pattern with an event streaming platform to support NOC workspace interoperability. NOC workspace interoperability may include a rendering of different views on different display units in a network environment where the different views are derived from the same model as described herein. A view may represent a product of a filtered model. The model may include queried decoupled telemetry data streams. The MCV design pattern may include a structure that divides an application into three main logical components (e.g., model component, controller component, and view component) to handle specific aspects of the application. In one example, a plurality of telemetry data streams from heterogeneous sources are pushed into an event streaming platform (e.g., Apache Kafka™), and the model component decouples the telemetry data streams that it has subscribed to receive from the event streaming platform. In one example, the model component may subscribe to pushed telemetry data streams that represent a detected event. The controller component that is in communication with the model component may then perform a filtering operation on a queried decoupled telemetry data streams (models) to support multiple real-time views (view). As used herein, the term "real-time" may imply a latency of below 80 milliseconds. The filtering operation, for example, may include applying different functions over the same model in order to generate different products that will be rendered on one or more different screens or display units in the view component. In this manner, the controller component in the NOC server may control a rendering of snapshots of the decoupled telemetry data streams without affecting or losing control of continuity of the telemetry data streams that are sourced from the event streaming platform. As described herein, decoupling of telemetry data streams may include independently retrieving and processing the data streams without affecting the continuity or configuration of the telemetry data streams in the event streaming platform.

The architecture 100 may include media recording devices 102(1)-102(N) of different types. Each of the media recording devices 102(1)-102(N) may be a video recording device, an audio recording device, or a multimedia recording device that records both video and audio data. The media recording devices 102(1)-102(N) may include recording devices that are worn on the bodies of law enforcement officers, recording devices that are attached to the equipment, e.g., motor vehicles, personal transporters, bicycles, etc., used by the law enforcement officers. For example, a law enforcement officer that is on foot patrol may be wearing the media recording device 102(1). In another example, a patrol vehicle of the law enforcement officer may be equipped with the media recording device 102(2), and so on.

The media recording devices 102(1)-102(N) may be connected to a NOC server 104 through a network 106. The NOC server 104 may be part of a facility that is operated by a law enforcement agency or a facility that is operated by a third-party that is offering services to the law enforcement agency. The NOC server 104 may include web sockets 108(1)-108(N), a receiving queue 110, and a consumer application that includes a model component 120, controller component 130, and a view component 140. The model component 120 may include a data query module 122, telemetry data storage 124, and a model module 126 that includes snapshots of decoupled data streams in the telemetry data storage 124. The controller component 130 may be directly connected to the model component 120 and further includes a filtering module 132 and a monitor selector 134. The view component 140 may receive signals from the controller component 130 and further includes a plurality of monitors 142. The model component 120, controller component 130, and the view component 140 may form the MCV design pattern of the consumer application. Each component or module of the NOC server 104 can be realized in hardware, software, or a combination thereof. For example, the web-sockets 108(1)-108(N) may be implemented by a software module designed to establish communications with the media recording devices 102(1)-102(N), respectively.

The network 106 may be, without limitation, a local area network ("LAN"), a larger network such as a wide area network ("WAN"), a carrier network, or a collection of networks, such as the Internet. Protocols for network communication, such as TCP/IP, may be used to implement the network 106. The network 106 may provide telecommunication and data communication in accordance with one or more technical standards.

Each one of the web-sockets 108(1)-108(N) may include an endpoint of a two-way communication link between two programs running on the network 106. The endpoint includes an Internet Protocol (IP) address and a port number that can function as a destination address of the web-socket. Each one of the web-sockets 108(1)-108(N) is bound to the IP address and the port number to enable entities such as the corresponding media recording device(s) to communicate with the web socket. In one example, the web-sockets 108(1)-108(N) may be set up to receive telemetry data streams from the media recording devices 102(1)-102(N). The received telemetry data streams may be pushed to the queue 110 before they are decoupled and stored in the telemetry data storage 124. In one example, the decoupled telemetry data streams are initially transformed to conform with a schema structure (not shown) in the telemetry data storage 124. The schema structure may include data fields that support sensor formats of the media recording devices 102(1)-102(N).

The queue 110 may include management software that processes data streams to or from the web-sockets. The queue 110 may be implemented by an event streaming platform that supports a publish-subscribe based durable messaging system. The event streaming platform may receive telemetry data streams and store the received telemetry data streams as topics. A topic may include an ordered collection of events that are stored in a durable manner. The topic may be divided into a number of partitions that can store these events in an unchangeable sequence. In this case, the event streaming platform may receive the telemetry data streams, store these telemetry data streams as topics, and different applications may subscribe to receive these topics in the event streaming platform. The subscription to receive the telemetry data streams (topics) may be based upon a time period (e.g., within a certain time range or frequency) or upon detection of an event.

In one example, a plurality of telemetry data streams from the web sockets 108 are pushed into the queue 110 and stored as topics. Given a situation that the telemetry data storage 124 has subscribed to receive these topics based upon detection of an event, then the telemetry data storage 124 may decouple the telemetry data streams that include the detected event. For example, the detected event may include streaming videos and images that were uploaded by a law enforcement officer's camera. Given a situation where the model component 120 subscribed to receive this event upon its detection, then the model component 120 may decouple the telemetry data streams that represent the detected event from the queue 110. The decoupled telemetry data streams may include the event and associated device ID, timestamps, and a header. The decoupled telemetry data streams may be used to gather metrics from different locations, track activity of the media recording devices 102(1)-102(N), gather application logs, and/or investigate incidents in case of law enforcement operations.

The model component 120 may include an application that may perform management and transformation of the decoupled telemetry data streams from the queue 110. In one example, the model component 120 decouples the telemetry data streams from the queue 110 and stores the decoupled telemetry data streams in the telemetry data storage 124. Decoupling of telemetry data streams includes independently retrieving and processing the data streams without affecting the configuration of the source such as the queue 110.

With stored telemetry data streams in the telemetry data storage 124, the data query module 122 may be configured to query snapshots of the decoupled telemetry data streams and store the queried snapshots as models in the model module 126. For example, the queried snapshots from the decoupled telemetry data streams represent images or events that were uploaded from the first media recording device 102(1). In this example, the images or events may be stored as models in the model module 126. The images or events may be associated with the device ID of the first media recording device 102(1), timestamps of the events, and a header such as flags and data length.

In one example, the data query module 122 may separately query the decoupled telemetry data streams that represent a captured audio content from the decoupled telemetry data streams that represent video content. In this case, the model that may represent the audio content can be rendered separately from the model that represents the video content. Further, a media recording device may utilize an application that can represent the captured video content as a sequence of images, and each one of these images may be further subdivided into sections known as tiles. In this manner, the different tiles can be represented independently by different models since each tile can be queried separately from the decoupled telemetry data streams.

The controller component 130 may include an application that is tied to the model component 120. In one example, the controller component 130 utilizes different types of filters to generate different products (filtered telemetry data stream) from the same model. Each one of the generated different products may be rendered separately and independently in the view component 140. For example, a particular model in the model module 126 includes decoupled telemetry data streams that represent 10 sequences of images that were taken at different timestamps and at a different angle of views. In this example, the filtering module 132 may separate and render each one of the images on different screens based on timestamps and/or angle of views, change scale of each one of the images, change color format, and the like. In this manner, the filtering module 132 may dynamically control the views to be rendered in the display units by applying different functions on the same model. The generating of the model includes, for example, querying of stored decoupled telemetry data streams based upon a device ID, timestamp, header, key-value pairs, a configuration of the display units in the view component, or based upon user-entered criteria.

The monitor selector 134 may be configured to select the first monitor 142(1), second monitor 142(2), or a combination thereof, which can render the generated filtered telemetry data stream from the filtering module 132. In one example, a configuration of the monitor as a target destination may be utilized during the filtering of the model, for example, a model that includes a high resolution for which a single display unit ($1^{st}$ monitor 142(1)) cannot show the content. In this example, the image stream can be filtered to split the content for rendering at the $1^{st}$ monitor 142(1) and the $2^{nd}$ monitor 142(2). In another example, the display unit is using a color format that is different from the color format that is by the application in the media recording device. In this other example, the filtering of the model may include changing of the color format of the model in the model module 126.

Example Filtering of the Model in an MCV Design Pattern

Figure 2:
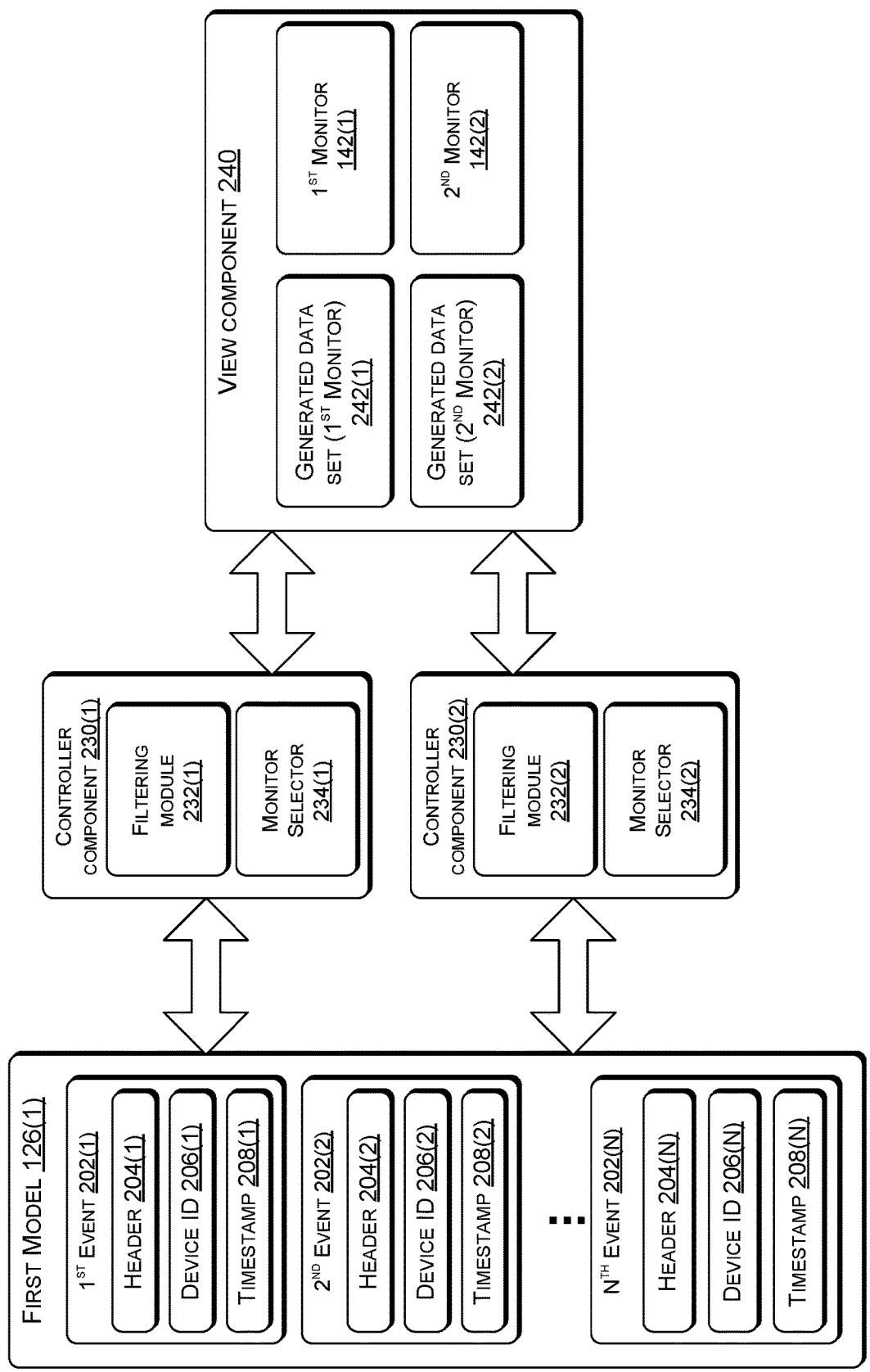
FIG. 2 is a block diagram of an example implementation of the MCV design pattern that processes decoupled telemetry data streams that can be queried from a telemetry data storage in order to support the NOC workspace interoperability, in accordance with at least one embodiment.

FIG. 2 is a block diagram of an example MCV design pattern 200 that may process the decoupled telemetry data streams that were queried from the telemetry data storage. The MCV design pattern 200 may represent a customer application in the NOC server to support NOC workspace interoperability. In one example, a controller component may control a rendering of snapshots of the decoupled telemetry data streams in the model component without losing control of the continuity of the decoupled telemetry data streams which is critically important in law enforcement operations. The MCV design pattern 200 includes an example first model 126(1) that represents a queried set of decoupled telemetry data streams from the telemetry data storage (not shown), controllers 230 (similar to controller component 130 of FIG. 1) that perform independent filtering operations/function on the set of decoupled telemetry data streams represented by the first model 126(1), and a view component 240 (similar to view component 140 of FIG. 1) that receives filtered telemetry data streams that can be rendered on different display units—$1^{st}$ monitor 142(1) and $2^{nd}$ monitor 142(2). In one example, the first model 126(1) may include a plurality of events 202, and each one of the events 202 includes a header 204, a device ID 206, and a timestamp 208.

In one example, the first model 126(1) may include snapshots of the decoupled telemetry data streams that will be rendered in the view component 230. A snapshot may include a data set that is associated with a timestamp or a time period. The snapshot may also include the data set that is associated with a particular media recording device ID. In an implementation, the controller 230 may define the attributes of the model to be queried from the telemetry data storage such as the telemetry data storage 124 of FIG. 1. In this implementation, the attributes may be based upon the timestamp 208, device ID 206, and header 204. The timestamp 208 may include a date and/or time when the event, message, or record in the decoupled telemetry data streams was captured. The device ID 206 may include the IP address and/or device description. The header 204 may include identification of the telemetry data streams such as a number of bytes. Further, the header 204 may include an offset information (not shown) that is associated with the decoupled telemetry data streams when they were sourced from the event streaming platform. The offset may include a reference point for the model component 120 or the controller component 230 for tracking a last consumed record for each partition in the Apache Kafka™.

In one example, multiple controller components 230 may be used to perform filtering functions on the first model 126(1). For example, the first controller component 230(1) may utilize a filtering module 232(1) to access audio data streams (not shown) in each one of the events 202. In this example, the first controller component 230(1) may render the accessed audio data streams in the first monitor 142(1). In another example, the second controller component 230(2) may utilize a filtering module 232(2) to access data streams that represent images within a range of timestamps 208. In this example, the second controller component 230(2) may dynamically render or add views or images that are associated with a range of timestamps 208 in the view component 240. Alternatively, the second controller component 230(2) may dynamically delete rendered views or images that are associated with a range of timestamps 208 in the view component 240. In another example, the controller components 230 may filter the events to be rendered based upon the device ID 206. In this example, controller components 230 may independently render the events that are based on the device ID 206. In these examples, the controller components 230 transform the same first model 126(1) to render different snapshots of this model in the view component 240 without actually controlling the continuity of the decoupled telemetry data streams in the telemetry data storage. In this case, the controller components 230 may support workstation interoperability without altering the configuration of the decoupled telemetry data streams in the telemetry data storage.

In an example embodiment, the rendering of the first model 126(1) may be based upon a configured sensor format (not shown) in each one of the media recording devices 102. A sensor format may include a configuration of the media recording device 102 for collecting telemetry data that can be processed in the NOC server 104. For example, the media recording device 102 utilizes an application that separates data streams for each one of the tiles that form a single image. Upon forming of a model (e.g., first model 126(1)) that may represent the single image, the filtering module 232 may render separately the data streams for each one of the tiles that formed the signal image. In another example, the media recording device 102 utilizes an application that captures the image using a high resolution. In a case where the configuration of a target display unit in the view component 240 is not capable of showing the high-resolution image, then the controller component may scale or filter the high-resolution image to be displayed on different display units. In these examples, the controller components 230 transform the same model that will be rendered in the view component 240 without actually controlling the continuity of the decoupled telemetry data streams in the telemetry data storage 124.

Example NOC Server

Figure 3:
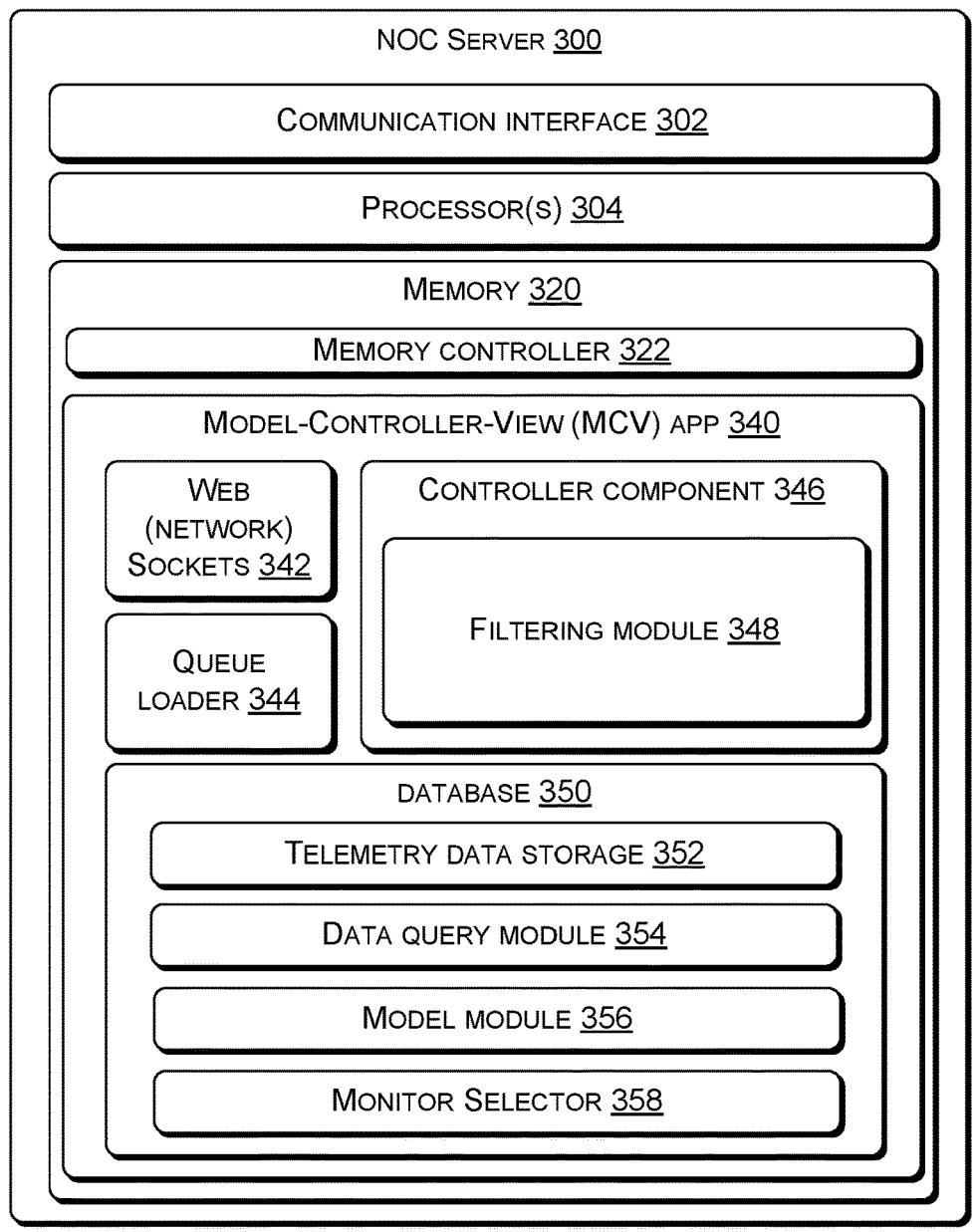
FIG. 3 is a block diagram of a NOC server that implements the integration of the MCV design pattern with the event streaming platform, in accordance with at least one embodiment.

FIG. 3 is a diagram of an example NOC server 300 that implements a model-controller-view (MCV) design pattern to process telemetry data from media recording devices. The NOC server 300 is similar to the NOC server 104 of FIG. 1 and may include a computer system that implements deployment of the media recording devices to capture telemetry data that can be rendered in different display units of a view component as described herein.

The NOC server 300 includes a communication interface 302 that facilitates communication with media recording devices such as the media recording devices 102(1)-102(N). Communication between the NOC server 300 and other electronic devices may utilize any sort of communication protocol known in the art for sending and receiving data and/or voice communications.

The NOC server 300 includes a processor 304 having electronic circuitry that executes instruction code segments by performing basic arithmetic, logical, control, memory, and input/output (I/O) operations specified by the instruction code. The processor 304 can be a product that is commercially available through companies such as Intel® or AMD®, or it can be one that is customized to work with and control a particular system. The processor 304 may be coupled to other hardware components used to carry out device operations. The other hardware components may include one or more user interface hardware components not shown individually—such as a keyboard, a mouse, a display, a microphone, a camera, and/or the like—that support user interaction with the NOC server 300.

The NOC server 300 also includes memory 320 that stores data, executable instructions, modules, components, data structures, etc. The memory 320 may be implemented using computer-readable media. Computer-readable media includes, at least, two types of computer-readable media, namely computer-readable storage media and communications media. Computer-readable storage media includes, but is not limited to, Random Access Memory (RAM), Dynamic Random Access Memory (DRAM), Read-Only Memory (ROM), Electrically Erasable Programmable Read-Only Memory (EEPROM), flash memory or other memory technology, Compact Disc-Read-Only Memory (CD-ROM), digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. As defined herein, computer-readable storage media do not consist of and are not formed exclusively by modulated data signals, such as a carrier wave. In contrast, communication media may embody computer-readable instructions, data structures, program modules, or other data in a modulated data signal, such as a carrier wave, or other transmission mechanisms.

A memory controller 322 is stored in the memory 320 of the NOC server 300. The memory controller 322 may include hardware, software, or a combination thereof, that enables the memory 320 to interact with the communication interface 302, processor 304, and other components of the NOC server 300. For example, the memory controller 322 receives data (e.g., audio and video contents) from the communication interface 302 and sends the received data to an MCV app 340 for further processing. In another example, the memory controller 322 may retrieve data from memory 320 where the data will be processed in the processor 304.

The memory 320 stores the MCV app 340 that, when executed, implements filtering of the same models to generate a filtered product that can be rendered in the display units without actually controlling the continuity of the decoupled telemetry data streams from the event streaming platform such as the Apache Kafka™. As shown, the MCV app 340 includes a network or web-sockets 342, a queue loader 344, a controller component 346, a filtering module 348, and a database 350. The database 350 may further include a telemetry data storage 352, a data query module 354, a model module 356, and a monitor selector 358. In one example, each component of the MCV app 340 can be realized in hardware, software, or a combination thereof. For example, the controller component 346 is a combination of hardware and software module that is tied to the database 350 to control the views that will be rendered in the display units (not shown).

The web-sockets 342 are similar to web-sockets 108(1)-108(N) of FIG. 1. The web-sockets 342 may be implemented by a software module designed to establish communications with the media recording devices 102(1)-102(N), respectively. In one example, each one of the web-sockets 108(1)-108(N) is bound to the IP address and the port number to communicate with the corresponding media recording device.

In one example, the queue loader 344 may include an application programming interface (API) to establish a connection with the event streaming platform such as the Apache Kafka™. The event streaming platform may utilize logs to store the telemetry data streams from the media recording devices. The logs are immutable records of things or events. The logs may include topics and partitions to store the telemetry data streams. In one example, the model component of the NOC server 300 may subscribe to the topics in the event streaming platform and utilize the queue loader 344 to decouple the telemetry data streams that the NOC server 300 has subscribed to receive. The decoupled telemetry data streams are stored in the telemetry data storage 352.

The controller component 346 is similar to the controller component 130 of FIG. 1 and the controller component 230 of FIG. 2. In one example, the controller component 346 may access and filter the models in the model module 356 for rendering at the display units in the view component. The controller component 346 may utilize the filtering module 348 in generating a filtered telemetry data stream that will be rendered at targeted display units. For example, the filtering module 348 identifies and separates the audio data stream from the video data stream. In another example, the filtering module 348 may apply a function on the model to change the color format, scale, positioning of an image in the display unit, and the like. In these examples, the controller component 346 may dynamically add or delete views in the display units without altering an order or continuity of the decoupled telemetry data streams in the telemetry data storage 352

The telemetry data storage 352, data query module 354, and the model module 356 are similar to the telemetry data storage 124, data query module 122, and the model module 126, respectively, of FIG. 1. The telemetry data storage 352, data query module 354, and the model module 356 may form the model component of the MCV app 340. The model component may be directly tied to the controller component 346, and the controller component 346 may use the monitor selector 358 to select the target display unit for the rendering of views.

Further functionalities of the NOC server 300 and its component features are described in greater detail, below.

Example Implementation—Rendering Telemetry Data Streams

Figure 4:
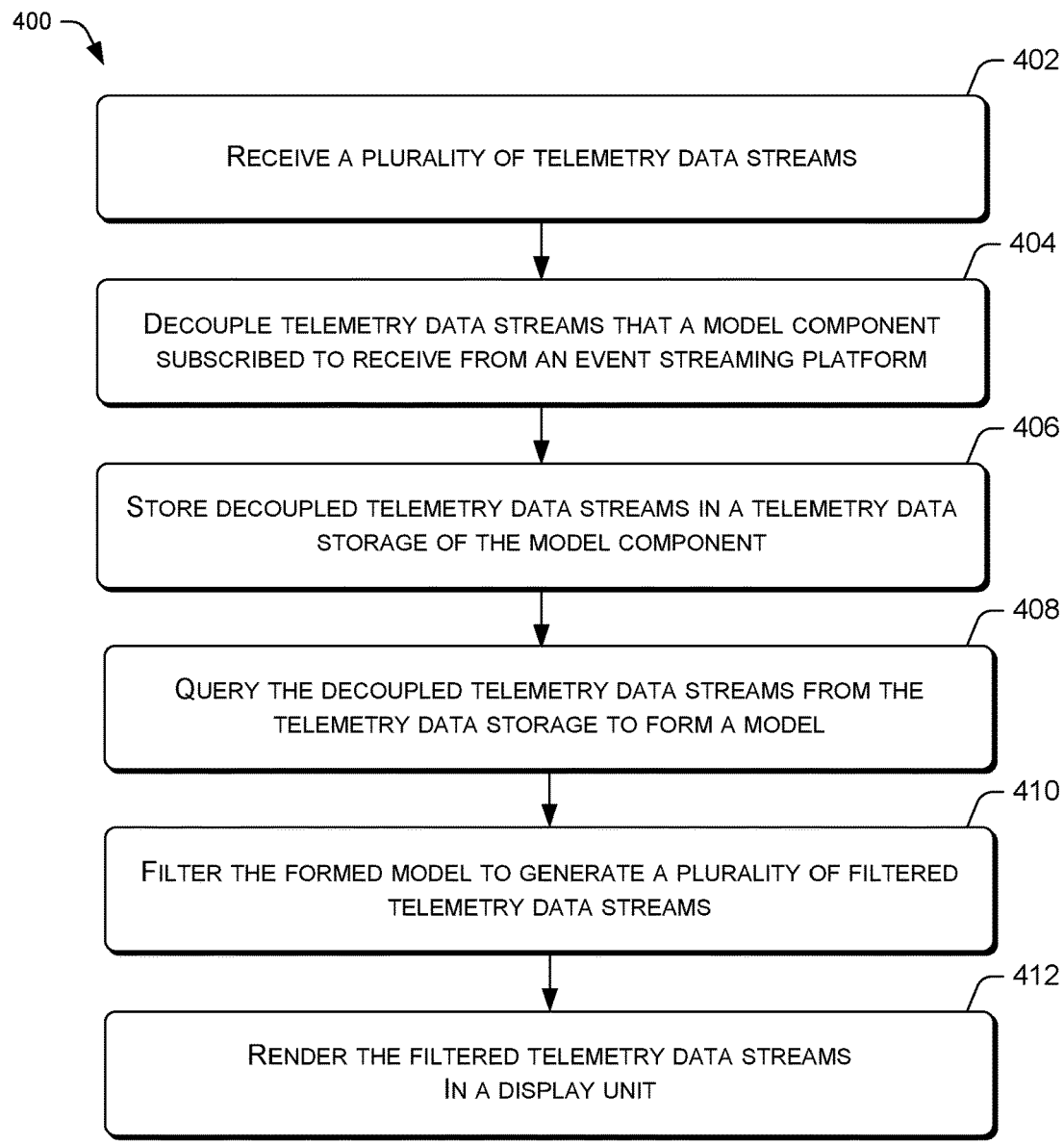
FIG. 4 is a flow diagram of an example methodological implementation for implementing the MCV design pattern to process the decoupled telemetry data that were queried from the telemetry data storage, in accordance with at least one embodiment.

FIG. 4 is a flow diagram 400 that depicts a methodological implementation of at least one aspect of the techniques for implementing a model-controller-view (MCV) design pattern that can process telemetry data that were decoupled from the telemetry data storage to support NOC workspace interoperability. In the following discussion of FIG. 4, continuing reference is made to the elements and reference numerals shown in and described with respect to the NOC server of FIGS. 1 and 3. Further, certain operations may be ascribed to particular system elements shown in previous figures. However, alternative implementations may execute certain operations in conjunction with or wholly within a different element or component of the system(s). Furthermore, to the extent that certain operations are described in a particular order, it is noted that some operations may be implemented in a different order to produce similar results.

At block 402, the queue 110 receives a plurality of telemetry data streams from the media recording devices 102. In one example, the queue 110 includes an event streaming platform that receives data packet streams encoded in JSON, XML or other structured data modeling language. The data packet streams, for example, include audio content, video content, metadata, virtual reality or augmented reality data, and information that may be captured by the media recording devices 102.

At block 404, the model component 120 decouples telemetry data streams that the model component 120 subscribed to receive from the queue 110 (e.g., event streaming platform). For example, model component 120 subscribes to detected events in the plurality of telemetry data streams in the queue 110. The detected events may include, for example, streamed videos and images that were uploaded from a particular media recording device or on a particular timestamp or date. In this example, the model component 120 may decouple the telemetry data streams that represent the detected events from the queue 110. The detected events may be associated with a device ID, timestamps, and headers.

At block 406, the telemetry data storage 124 stores the decoupled telemetry data streams in a telemetry data storage 124 of the model component 120. In some cases, the storing of the telemetry data streams may include conforming with a structure of a universal schema in the telemetry data storage 124. For example, the universal schema includes fields for device IDs, timestamp, event IDs, header, sensor format, and key-value annotations. In this example, the fields of the decoupled telemetry data streams may be identified and stored to conform with the structure of the universal schema.

At block 408, the data query module 122 queries the decoupled telemetry data streams from the telemetry data storage 124 to form a model 126. In one example, the querying is based upon a desired type of filter to be used upon a potential model. For example, the filtering module 132 may apply a device ID-based function on the model in the model module 126 to access certain video content. In this example, the querying of the decoupled telemetry data streams may be based upon the device ID that is associated with certain video content. In another example, the filtering module 132 may apply a function on the model that represents the data streams within a certain time range. In this other example, the querying of the decoupled telemetry data streams may be based upon a certain time range. In other cases, the querying is based upon user-entered parameters.

In one example, the controller 230 may define the attributes of the model to be queried from the telemetry data storage 124. In this implementation, the attributes may be based upon the timestamp 208, device ID 206, and header 204. The timestamp 208 may include a date and time of capture of the event, message, or record. The device ID 206 may include the IP address and/or device description. The header 204 may include information such as number of bytes, flags, and other similar information that is associated with the captured event. For example, the data query module 122 queries the decoupled telemetry data streams to form the first model 126(1) of FIG. 2. In this example, the controller component 230 may provide to the data query module 122 range of timestamps, device ID, and/or header for the query.

At block 410, the controller component 130 filters the formed model to generate filtered telemetry data streams. For example, the controller component 130 utilizes the filtering module 132 to separate audio data streams from video data streams. In another example, the filtering module 132 utilizes a function to access and render views that represent images that were captured within a range of timestamps 208. In this example, the controller component 130 may dynamically render or add the views or images that are associated with the range of timestamps 208. Alternatively, the controller component 130 may dynamically delete rendered views or images that are associated with a range of timestamps 208 in the view component 240. In these examples, the controller component 130 transforms the same model such as the first model 126(1) to render different snapshots of the model in the view component 240 without actually controlling the continuity of the decoupled telemetry data streams in the telemetry data storage 124.

At block 412, the controller component 130 renders the filtered telemetry data streams in a display unit. For example, the controller component 130 utilizes a monitor selector to identify the target screens or display units for the rendering of the filtered telemetry data streams. In this example, the controller component 130 provides workspace interoperability by controlling the same model and not the continuity of the decoupled telemetry data streams from the event streaming platform.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more computer-readable storage media collectively storing computer-executable instructions that upon execution cause one or more computers to collectively perform acts comprising:
   receiving, from a plurality of heterogeneous sources, a plurality of telemetry data streams;
   decoupling the telemetry data streams into renderable components;
   generating a model from the renderable components;
   filtering the model to remove one or more of the renderable components from the model;
   rendering at least some of the renderable components in the filtered model via respective display units; and
   dynamically controlling the renderings independently for the respective display units without losing control of continuity of the individual renderings.

2. The one or more computer-readable storage media of claim 1, wherein the acts further comprise:
   subscribing, by a model component, to a plurality of telemetry data streams in an event streaming platform; and
   storing, by a telemetry data storage, the decoupled telemetry data streams;
   wherein a view component renders the at least some of the renderable components in the filtered model via the respective display units;
   wherein a model component:
      decouples the telemetry data streams that the model component subscribes to receive from the event streaming platform; and
      generates the model by querying the stored decoupled telemetry data streams; and
   wherein a controller component:
      filters the model to remove one or more of the renderable components from the model; and
      dynamically adds or deletes views for rendering by the view component.

3. The one or more computer-readable storage media of claim 2, wherein the acts further comprise:
   storing, by a telemetry data storage in a model component, the decoupled telemetry data streams that the model component subscribed to receive from the plurality of telemetry data streams in an event streaming platform; and
   querying the stored decoupled telemetry data streams from the telemetry data storage to generate the model;
   wherein the querying of the decoupled telemetry data is based upon timestamps that are associated with the decoupled telemetry data streams.

4. The one or more computer-readable storage media of claim 1, wherein:
   the decoupled telemetry data streams include events captured by the plurality of heterogeneous sources; and
   the heterogeneous sources include different types of media recording devices.

5. The one or more computer-readable storage media of claim 1, wherein the rendered components in the model are associated with a respective device identification, a header, and a timestamp of an event.

6. The one or more computer-readable storage media of claim 5, wherein the filtering utilizes the timestamp of the event to remove the one or more renderable components from the model.

7. The one or more computer-readable storage media of claim 5, wherein the filtering utilizes the device identification to remove the one or more renderable components from the model.

8. A computer system, comprising:
   an event streaming platform that integrates a model component, a controller component, and a view component in a model-controller-view (MCV) design pattern;
   one or more processors; and
   memory that stores the model component, the controller component, and the view component in the MCV design pattern, wherein:
   the model component receives, from a plurality of heterogeneous sources, a plurality of telemetry data streams, and queries the decoupled telemetry data streams to form a model of renderable components;
   the controller component filters the model to remove one or more of the renderable components from the model; and
   the view component renders at least some of the renderable components in the filtered model independently for respective display units under dynamic control by the controller component without losing control of continuity of the individual renderings.

9. The computer system of claim 8, wherein the decoupled telemetry data streams include detected events captured by the plurality of heterogeneous sources, and the heterogeneous sources include different types of media recording devices.

10. The computer system of claim 8, further comprising:
telemetry data storage that stores decoupled telemetry data streams that the telemetry data storage subscribes to receive from the plurality of telemetry data streams in the event streaming platform;
wherein the data query module queries the decoupled telemetry data streams based upon timestamps that are associated with the decoupled telemetry data streams.

11. The computer system of claim 8, wherein the rendered components in the model are associated with a respective device identification, a header, and a timestamp of an event.

12. The computer system of claim 11, wherein the controller component utilizes the timestamp of the event to remove the one or more renderable components from the model.

13. The computer system of claim 11, wherein the controller component utilizes the device identification to remove the one or more renderable components from the model.

14. The computer system of claim 8, wherein the controller component dynamically adds and deletes views for rendering by the view component.

15. The computer system of claim 14, wherein the views represent the plurality of filtered telemetry data streams.

16. A computer-implemented method, comprising:
receiving, from a plurality of heterogeneous sources, a plurality of respective telemetry data streams associated with an event;
decoupling the telemetry data streams into renderable components;
generating a model from the renderable components;
filtering the model to remove one or more of the renderable components from the model;
rendering at least some of the rendered components in the filtered model via respective display units; and
dynamically controlling the renderings independently for the respective display units without losing control of continuity of the individual renderings.

17. The computer-implemented method of claim 16, further comprising:
subscribing, by a model component, to a plurality of telemetry data streams in an event streaming platform;
storing, by a telemetry data storage in the model component, the decoupled telemetry data streams; and
querying the decoupled telemetry data streams to form the model.

18. The computer-implemented method of claim 16, wherein the event is associated with a device identification, a header, and a timestamp.

19. The computer-implemented method of claim 18, wherein the rendering includes adding of views in the display unit based upon the timestamp of the event.

20. The computer-implemented method of claim 16, wherein the filtering utilizes a configuration of the display unit.

* * * * *